United States Patent [19]

Elder et al.

[11] Patent Number: 5,535,389
[45] Date of Patent: Jul. 9, 1996

[54] BUSINESS PROCESS OBJECTS WITH ASSOCIATED ATTRIBUTES SUCH AS VERSION IDENTIFIER

[75] Inventors: David B. Elder, Alpharetta; Stephen P. Krosner, Marietta; Paul E. Miller, Atlanta, all of Ga.; Harold R. Skinner, Rochester, Minn.

[73] Assignee: International Business Machines Corporation, Armonk, N.Y.

[21] Appl. No.: 9,170

[22] Filed: Jan. 26, 1993

[51] Int. Cl.$^6$ ........................... G06F 9/44
[52] U.S. Cl. ............ 395/700; 364/DIG 1; 364/284; 364/284.3; 364/280
[58] Field of Search .................................. 395/700

[56] References Cited

U.S. PATENT DOCUMENTS 4,635,208  1/1987  Cdeby et al. ...................... 364/491
5,265,206  11/1993  Shackelford et al. ............. 395/200
5,291,593  3/1994  Abraham et al. .................. 395/600

OTHER PUBLICATIONS

Release 1.0, "A Primer on Plumbing: Capturing Scripts", May 1991 v91 n5 p.10(s).

Primary Examiner—Kevin A. Kriess
Attorney, Agent, or Firm—John J. Timar; Kenneth A. Seaman

[57] ABSTRACT

The present invention is directed to systems and methods for providing a repeatable business process capability in an object oriented computing environment. Business process information, including a set of object-action messages and the logical sequence in which the messages are executed is captured in business process objects. The business process objects are generated, modified and invoked through the user-workplace interface.

9 Claims, 15 Drawing Sheets

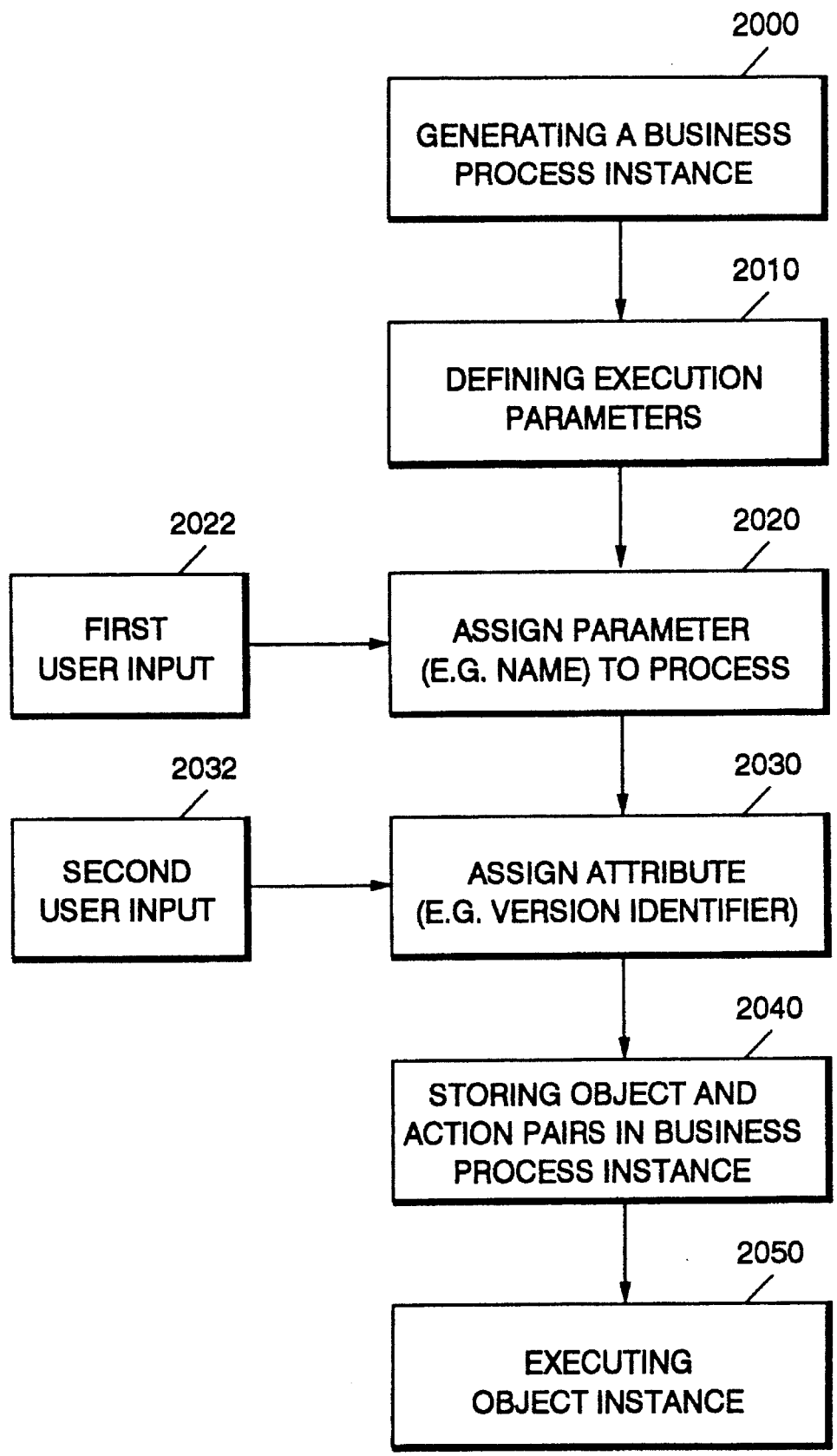

```
* EKNUTASK ------    Processes      -----------------*
|                                                    |
|    Add a new LDRO to a folder's TOC                |
|    Add an existing LDRO to a folder's TOC          |
|    Add an existing REA to a folder's TOC           |
|    Add an existing EC to a folder's TOC            |
|    Add an existing folder to a folder's TOC        |
|                                                    |
*----------------------------------------------------*
```

FIG. 17

BUSINESS PROCESS OBJECTS WITH ASSOCIATED ATTRIBUTES SUCH AS VERSION IDENTIFIER

BACKGROUND OF THE INVENTION

This invention relates generally to systems and methods for providing repeatable process capabilities in object oriented computing systems (also called object oriented computing environments). In particular, the present invention relates to systems and methods which use business process objects to provide such repeatable process capabilities.

In an object oriented environment, there are no programs and data as in the traditional sense. All processing is done by routines known as methods which are encapsulated with the data that they process, into entities known as objects.

An object is anything that has value to the end result, or is an input to the end result of some form of work to be done. All objects are represented by data and methods, which when combined are said to be encapsulated. This encapsulation hides the data of the object from everything except the methods of the object.

The combined set of methods, along with the data that the methods have access to, represents a unit of processing. This unit is known as the behavior of the object. When a set of behaviors is put together to accomplish an end result, it is known as a process.

When an object needs to invoke the methods of another object, it sends the target object a message requesting that a certain method or action be performed on, or with, the target object's data. This behavior may cause other messages to be emitted, expanding the overall behavior that is executed. Each message is comprised of the object and action to be exercised, and is known as an object-action message. The object actually sends messages to a software component called an object manager that makes certain that the target object is available and routes the object-action message to the target object.

Normal execution in an object oriented environment is a single user-directed object-action. This allows the maximum granularity of combinations of behavior for the user, but makes very complex or repetitious behavior difficult to repeat or measure. For a predetermined sequence of object-actions that are to be repeated frequently as a process, this mode of operation is very tedious and error-prone. Control of many processes demands repeatable sequences that can be measured and tracked. Each repeatable sequence is known as a business process. The user selects and sequences the series of object-action pairs to be processed to arrive at a desired result. This mode of operation is dictated by the user-workplace interface model that spreads available objects on the user's desktop, and allows the user to select one object and then choose the action to be performed on the object, or using the object.

When data that is accessible by multiple objects is processed, the state of the data must be managed within the context defined by the user. Data must be recoverable in the same context in which it is used. If an update to data that is contextually related to other data fails, then prior updates to related data may be contextually invalid and must be undone to return to the state that existed prior to the update. Contextually related data is managed by what is known as a unit of work manager. Data that has completed all state changes in a contextual relationship must be committed to the database. When an error occurs, data must be recovered, or rolled back to the original state.

The object manager of an object-oriented processing environment provides the contextual relationship of data that is used by a user. The same context in which a user updates data is used to undo changes when an error occurs.

Since the object manager has knowledge of the objects and actions that are specified by the user, and the sequence in which objects are affected, this information is not only of value for logical unit of work management, but can also be used to define a specific sequence of object-action pairs (messages) that can then be used in a repeatable sequence or business process.

SUMMARY OF THE INVENTION

The present invention is directed to computer application programs which operate in an object oriented computing environment on a data processor containing a memory, in which a plurality of objects are categorized into one or more classes which define methods of the objects categorized therein, and in which messages are sent by the data processor to at least one object to perform at least one action upon the object.

In particular, the present invention is directed to systems and methods of the computer application programs for providing a repeatable business process capability. The repeatable business process capability is used to define a specific sequence of object-action messages that form a business process, and which are captured and saved for subsequent selection and execution through the user-workplace interface. The repeatable business process capability is implemented using business process objects.

The present invention is further directed to systems and methods of the computer application programs for providing a repeatable business process capability in the object oriented computing environment such that a specific sequence of object-action messages can be repeated frequently and without introducing any user entry error into the sequence of messages.

The present invention provides a repeatable business process capability in an efficient manner by storing business process information in business process objects. The business process information stored in the business process objects includes messages (i.e., objects and actions) that the user has specified and the logical navigation, or sequence, of these messages.

A better appreciation of these and other advantages and features of the present invention, as well as how the present invention realizes them, will be gained from the following detailed description and drawings of the preferred embodiment, and from the claims.

BRIEF DESCRIPTION OF THE DRAWINGS

The present invention will be described with reference to the accompanying drawings, wherein:

FIG. 10A shows a block diagram of the present invention, illustrating the process of executing and storing object and action pairs in an object oriented environment.

FIG. 17 shows an example of a screen display for user selection of a business process instance.

DETAILED DESCRIPTION OF THE PREFERRED EMBODIMENTS

This section first provides a brief description of object oriented computing system concepts which are pertinent to the present invention. A more detailed description of the concepts discussed in this section can be found in a number of references, including *Object-Oriented Systems Analysis* by Sally Shlaer and Stephen J. Mellor (Yourdon Press Computing Series, 1988), *Object Oriented Design with Application* by Grady Booch (The Benjamin/Cummings Publishing Company, 1990) and *Object Oriented Software Construction* by B. Meyer (Prentice Hall, 1988).

Figure 1:
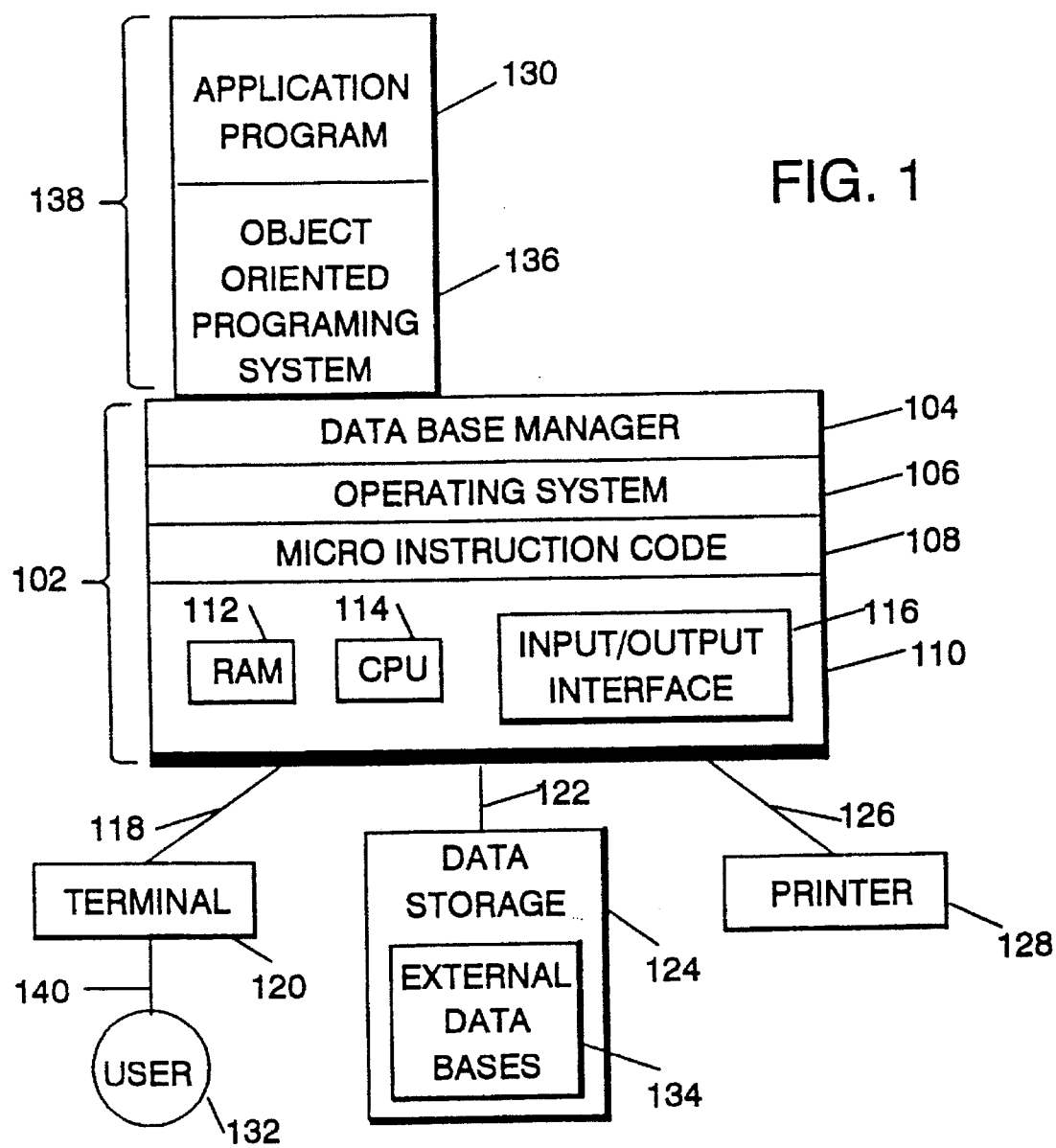
FIG. 1 shows a graphical representation of a computing environment in which the present invention operates.

As shown in FIG. 1, an object oriented programming environment contains a computer program 138 which operates on a computer plaltform 102. The computer program 138 includes an application program 130 and an object oriented programming system 136.

The computer platform 102 includes hardware units 110 including a central processing unit (CPU) 114, a main memory (RAM) 112, and an input/output interface 116.

The computer platform 102 also includes microinstruction code 108, an operating system 106, and a database manager 104. Various peripheral components may be connected to the computer platform 102, such as a terminal 120, a data storage device 124, and a printing device 128. The data storage device or secondary storage 124 may include hard disks and tape drives. The data storage device 124 represents non-volatile storage. External databases 134 are stored on the secondary storage 124. In object oriented programming systems the operating system uses virtual memory and manages all paging.

Users 132 interact with the computer platform 102 and the computer program 138 via terminal 120.

In a preferred embodiment of the present invention, the computer platform 102 includes a computer having an IBM System 370 architecture. The operating system 106 which runs thereon is an IBM Multiple Virtual Storage (MVS). The database manager 104 is an IBM DB2, which is a relational database manager. Also, the computer program 138 is preferably written in Intermediate C, which is an object oriented dialect of the C computer programming language. Intermediate C is similar to the C++ computer programming language.

Figure 2:
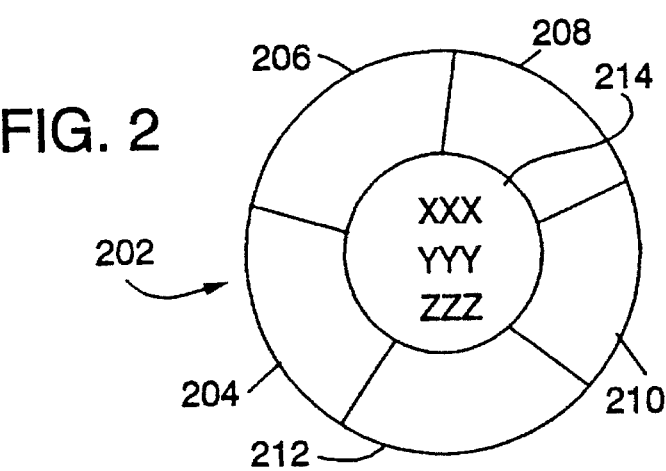
FIG. 2 shows a graphical representation of an object instance in connection with the present invention.

FIG. 2 presents a graphical representation of an object 202. The object 202 contains data 214 (also called attributes) and the actions 204, 206, 208, 210, 212 (also called methods). Generally, methods are categorized as functions or procedures. A function is a type of code that will return a result. Normally a function tends not to modify the state of the parameters given.

As shown in FIG. 2, the object 202 is modeled by a doughnut, with the data 214 being in the center of the doughnut. The data 214 represent various attributes of the object 202. The color of one's eyes, date of birth, name, etc., could be attributes of an object representing a person. Around the outer part of the doughnut, are the actions (also called methods) 204, 202, 208, 210, 212 to be performed on the data 214.

Object oriented programming systems categorize objects into classes. Thus, a class defines the features of its objects. A feature is either a method or an attribute. Features can be either exported, i.e., other methods can call them, or features can be non-exported, i.e., they can not be called except by a within-class method. An instance is a specific object with the features defined by its class.

An object has an arbitrarily unique value when using the example of doughnuts representing objects of the same type of class. The outer part of the doughnuts which represent the actions or functions of the instance objects are arranged identically for each of the objects in the particular class. Similarly, the data in the inside of the doughnuts is identically structured. Therefore, if two objects are of the same type, their structures are identical except for the actual data or attribute values.

The functions or actions to be performed on the data totally surround the data and in a sense encapsulate the data. Conventionally, the only programming that is allowed to know anything about the data are the functions or the routines in the outer part of the doughnut. This form of data encapsulation is not exclusive to object oriented programming. The basic idea behind data encapsulation is to minimize the number of system pieces that one must understand to form a particular set of data attributes.

The functions encapsulating a specific object are the only elements that know or care what the encapsulated data looks like. The functions isolate the encapsulated data from other parts of the system. Therefore one ends up with ultimate flexibility over time to change the data of an object in any desired fashion. Optimally, one is capable of modifying the system as technologies change, by merely changing the data. Alternatively, the product is portable. It can be moved from a relational data base to a hierarchical data base, or to a PC having no particular data base at all. A user is only required to change pieces of the internal data. An object only needs to be concerned about how it represents the data for which it is responsible. This is fundamental to an object oriented environment, since it is a large, portable software product.

Figure 3:
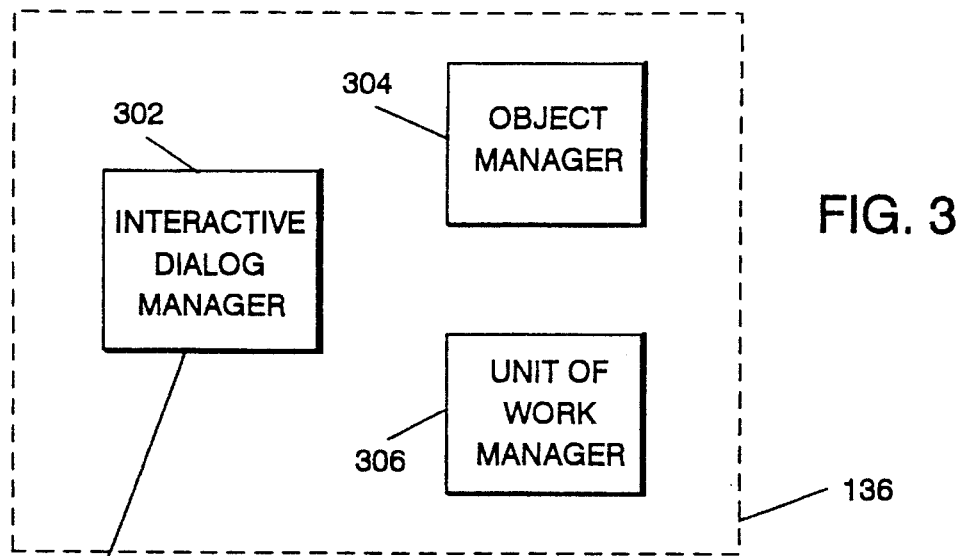
FIG. 3 shows a structural diagram of an object oriented computing environment module.

FIG. 3 presents a structural diagram of the object oriented computing environment module 136. As shown in FIG. 3, the object oriented computing environment module 136 includes an interactive dialog manager 302, an object manager 304, and a unit of work manager 306.

The interactive dialog manager 302 interacts with the user 132 and with objects such as 202 existing in the application program module 130. The interactive dialog manager 302 receives user commands during interactive, batch and remote processing and sends messages to appropriate objects to implement the user commands.

The object manager 304 and the unit of work manager 306 work together to retrieve the data 214 associated with persistent object instances 202 from the external database 134 and to write and commit the committable data 214 to the external database 134.

The object manager 304 maintains information about persistent object instances 202. The information maintained by the object manager 304 includes a list of the persistent object instances 202, a list of the persistent object instances 202 which are in main memory 112, and a list of the persistent object instances 202 whose methods and committable actions contained therein have produced committable data. The information maintained by the object manager 304 are stored in information tables which are maintained in main memory 112.

The information maintained by the object manager 304 also includes a list of units of work and the persistent objects 202 which are in the units of work. A unit of work defines a program segment which contains committable actions. Commit messages to the unit of work manager 306 affect only the committable actions in the units of work where the commit messages are sent. For example, if units of work UOW_1 and UOW_2 exist, then a commit message sent from the unit of work UOW_1 affects only the committable actions in the unit of work UOW_1.

The unit of work manager 306 receives and processes commit messages from methods. The unit of work manager 306 is an object instance. Upon receiving a commit message from a method, the unit of work manager 306 communicates with the object manager 304 to determine the unit of work associated with the method. The unit of work manager 306 further communicates with the object manager 304 to determine the committable data in the unit of work associated with the method. The unit of work manager 306 also determines the persistent object instances 202 associated with the committable data.

The unit of work manager 306 then sends messages to dematerialize methods in the persistent object instances 202 associated with the committable data. In response to the messages from the unit of work manager 306, the dematerialize methods interact with the database manager 104 to write the committable data to the external databases 134.

The unit of work manager is described in greater detail in a co-pending, commonly assigned application Ser. No. 425,607, filed Oct. 23, 1989, entitled "Unit of Work for Preserving Data Integrity of a Database," the disclosure of which is incorporated herein by reference.

Object oriented programming systems are message based systems. Objects invoke or ask other objects to perform an action. A message is an object/action pair with the following format: OBJ@ACTION; the left side of the message operator identifies a specific "object" and is an object reference 300, and the right side specifies what "action" is to be performed on, or with the object. The "@" symbol represents a message operator in intermediate C. If the action is a functional procedure which requires parameters, the syntax of the message object and action will also be followed by a parameter or string of parameters offset by parentheses and separated by commas.

The message is essentially a call. Conceptually, it is a call to a part of the object or into the enabling system called a messenger. A messenger's job is to deliver a request to other objects. The system will essentially see a call to the messenger which will find out where this particular object is located. In this illustration the messenger will essentially pass the call on to that object.

The object manager (304) must resolve both sides of the message operator. It is the messenger's job using a data structure called an object reference to find the correct piece of code, otherwise known as a method, and to find the correct block of data, otherwise known as a data frame. The action is a segment of code, and the object actually identifies a block of data.

Class objects are managed by a loaded classes table (LCT). Instance objects are managed by an object management table (OMT). Object references are pointers used to point to class objects and instance objects. Class objects and instance objects are referred to as frames and are not directly manipulated except by the methods which operate on them.

Figure 4:
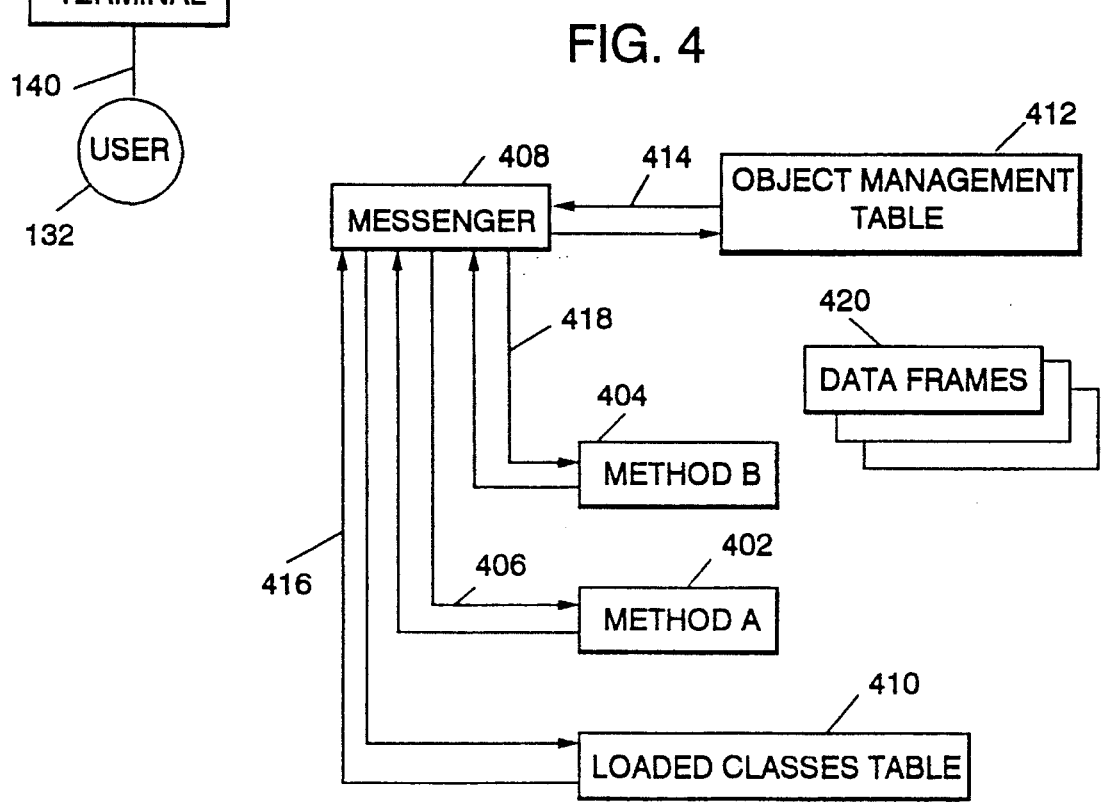
FIG. 4 shows a messaging system in connection with the present invention.

The flow for the invocation of an instance method is depicted in FIG. 4. Method A of some instance 402 sends a message to method B of some instance 404, which results in a call 406 to the messenger 408. The messenger 408 must resolve class and default instance data addresses by calling the loaded classes table (LCT) 410. The LCT keeps track of those classes which have already been loaded into memory. Classes are not loaded until they are referenced. They are then left in memory for the duration of the session. If the class of instance 402 has not been loaded, the LCT 410 will load it at this time and then call the class to materialize its data.

If the object is an instance, the messenger 408 asks the object management table (OMT) 412 for an indirection pointer to the data frame of the instance object specified by the message. The object manager 304 searches the entries in object management table 412 for a matching object ID. If the instance object is located in the table, the OMT 412 returns the indirection pointer to the instance object, as shown by arrow 414. Otherwise, if this search does not resolve the matching object, and if it is a persistent object, a frame will then be allocated in memory to hold the persistent data. This new object is called to materialize its data from the database.

The messenger 408 calls the LCT 410 for the address of the method specified by the message. At the same time, it establishes the class and default instance data offsets for the method so that it can access the correct data within the object. The LCT 410 searches the classes for the specified method and returns the address of the method to the messenger as depicted by arrow 416.

Using the address just received from the LCT 410, the messenger 408 will call method B 404 as shown at arrow 418, passing it a system data area and the parameters from the call made by method A. The system data area has, among other things, the indirection pointer returned by the OMT 412. If Method B is an instance method, it will access data frame 420 using the indirection pointer which points to the data through an entry in the OMT 412. Alternatively, if it is a class method it will be accessing the class data and the default instance data.

The preferred embodiment of the object manager and messenger is covered in co-pending, commonly owned application Ser. No. 07/602,442, filed Oct. 23, 1990, and entitled, "A Messenger and Object Manager to Implement an Object Oriented Environment", the disclosure of which is incorporated herein by reference.

The preferred embodiment of the object reference data structure is covered in co-pending, commonly owned application Ser. No. 07/602,575, filed Oct. 24, 1990, and entitled, "Object Reference for Use Within an Object Oriented Environment", the disclosure of which is incorporated herein by reference.

In addition to class objects and instance objects, there is another type of data structure in the present object oriented programming system that is referred to as slot objects. These are not true objects as are class and instance objects. Slot objects are data areas that have methods on them. They exist only within an enclosing instance or as local data within a method. Slot objects do not have entries in the OMT 412 and are not visible outside of the enclosing instance or method. Slot objects are passed as whole data structures. No pointers are used to reference slots.

The first piece of data, or first inherited attribute, in a slot is an object reference that merely points to itself. Following the object reference is any other type of data defined by the particular slot object. Slot objects do not only exist inside of frame objects, they can also be local variables within a method.

Slots are used for optimization. Since slots do not have to be stored in a table, they are economical to use. When a message is sent, the messenger 408 passes the address of the object reference. In a slot object, that address is also the address of the instance. The address of the object reference, which is the first piece of data within a slot, is the address of the slot object.

The preferred embodiment of slot objects is covered in co-pending, commonly owned application Ser. No. 07/425,746, filed Oct. 23, 1989, and entitled "Slot Objects for an Object Oriented Programming System", the disclosure of which is incorporated herein by reference.

Figure 5:
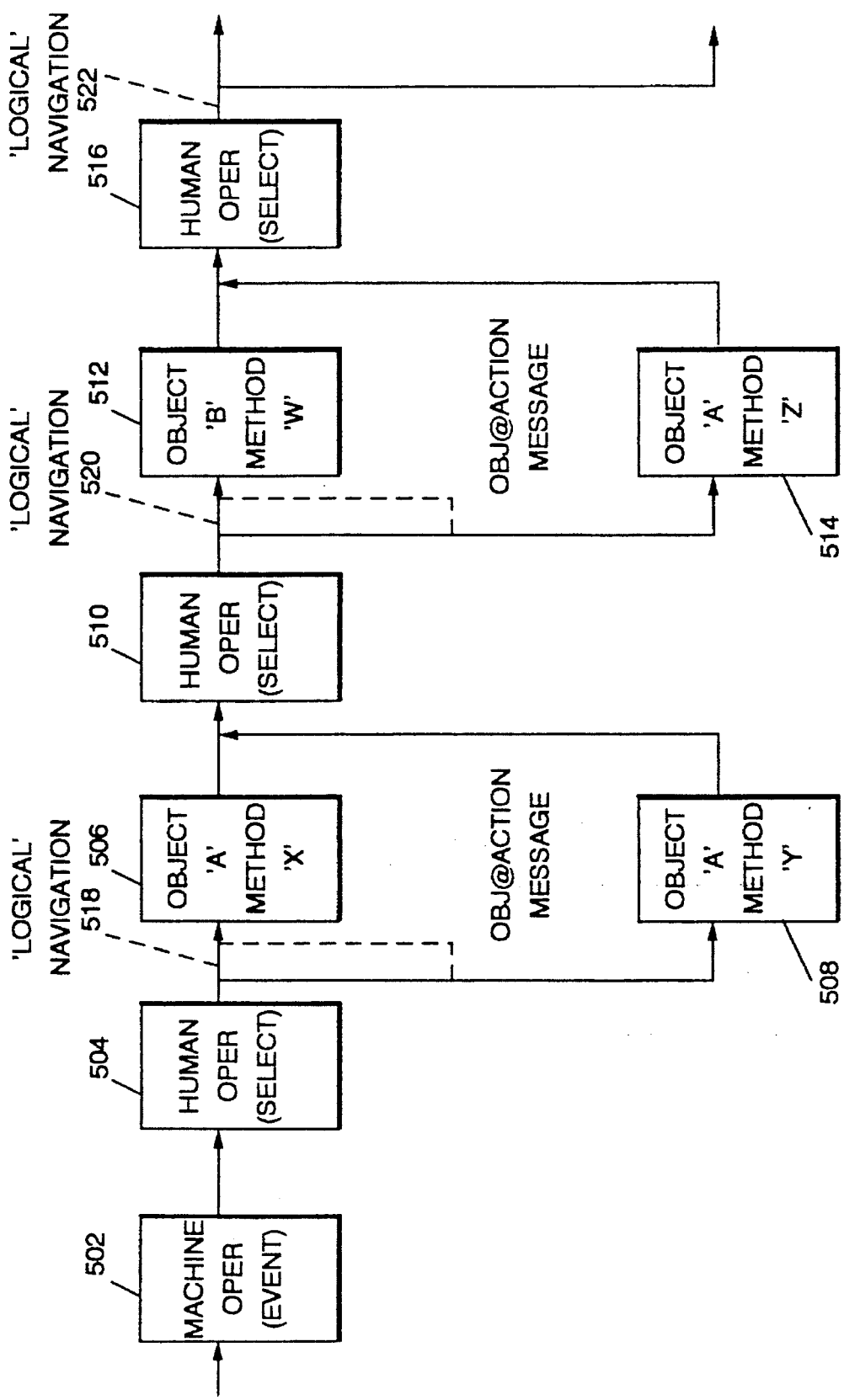
FIG. 5 shows an example of a user-driven object-action business process.

In an object oriented computing environment such as the one that has been described, each user is in control of the selection and sequence of object-action pairs that are processed to arrive at a desired result. For a predetermined result that is to be repeated multiple times, this mode of operation is very tedious and error-prone. This selection and sequencing process is represented in FIG. 5. Each application function (object method) 506, 508, 512, 514 in the process is initiated by a user's selection 504, 510, 516 using logical navigation 518, 520, 522 of the related objects. Each step in the process is initiated by messages that are sent to the object manager 304 and are captured in unit of work tables. The sequence, or logical navigation, of the messages is defined by the user's selection of object-action pairs.

Figure 6:
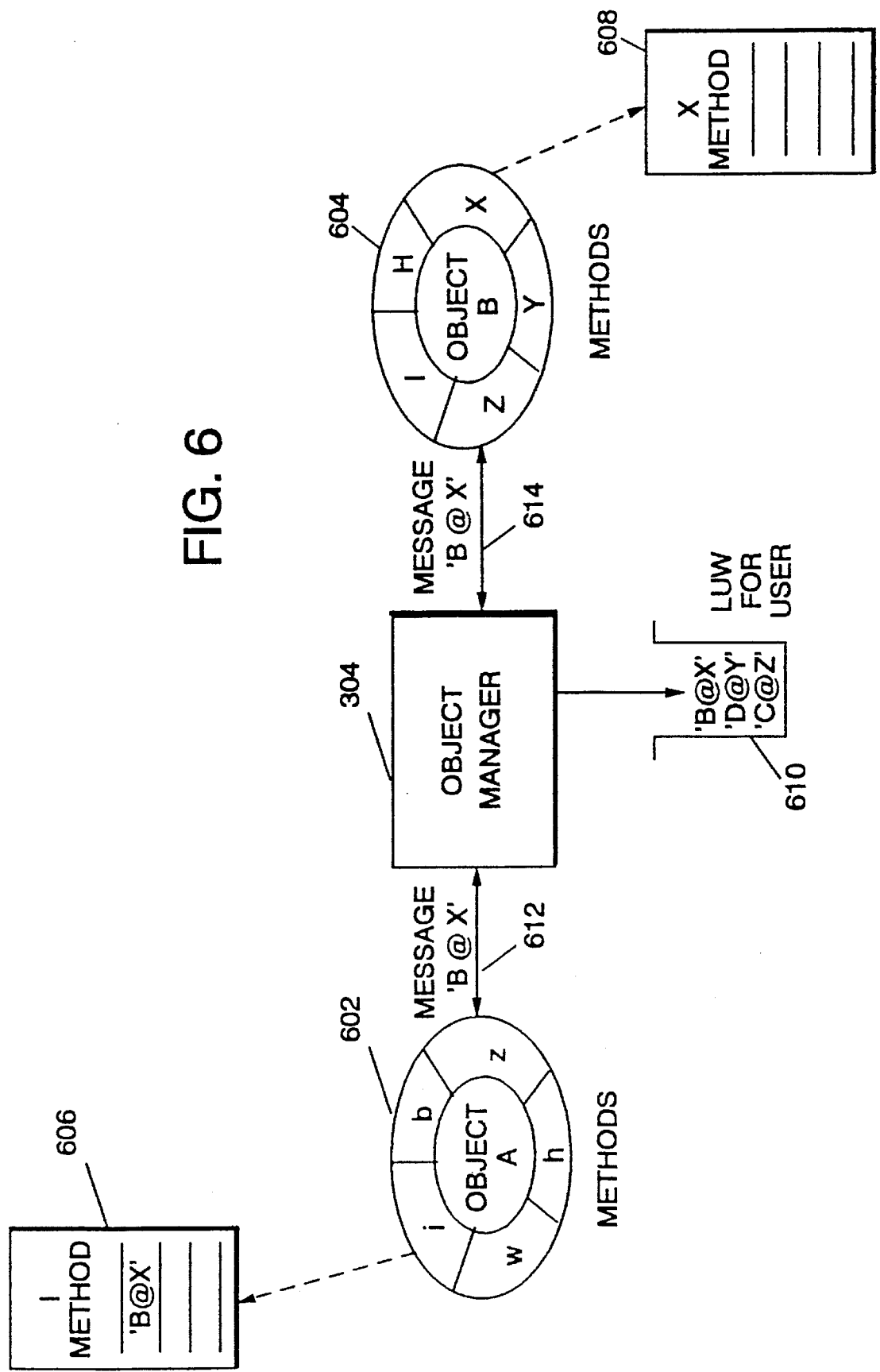
FIG. 6 shows an example of object manager message routing.

Object manager message routing is illustrated in FIG. 6. Object A 602 sends a message ('B@X') 612 to object manager 304, indicating that method X is to be performed for object B 604. The object manager 304 captures the information as part of the user's logical unit of work (LUW) 610, and routes the message to object B 604. Completion of method X 608 may result in a change of state for object B 604, which must be captured by the object manager 304 in the logical unit of work.

Since the object manager 304 has knowledge of the objects and actions (messages) that the user has specified, and the sequence in which the objects were affected (referred to as logical navigation), this information is not only of value to logical unit of work processing and management, but can also be used to define a specific sequence of object-action pairs (messages) that can then be used in a repeatable sequence, or business process.

Figure 7:
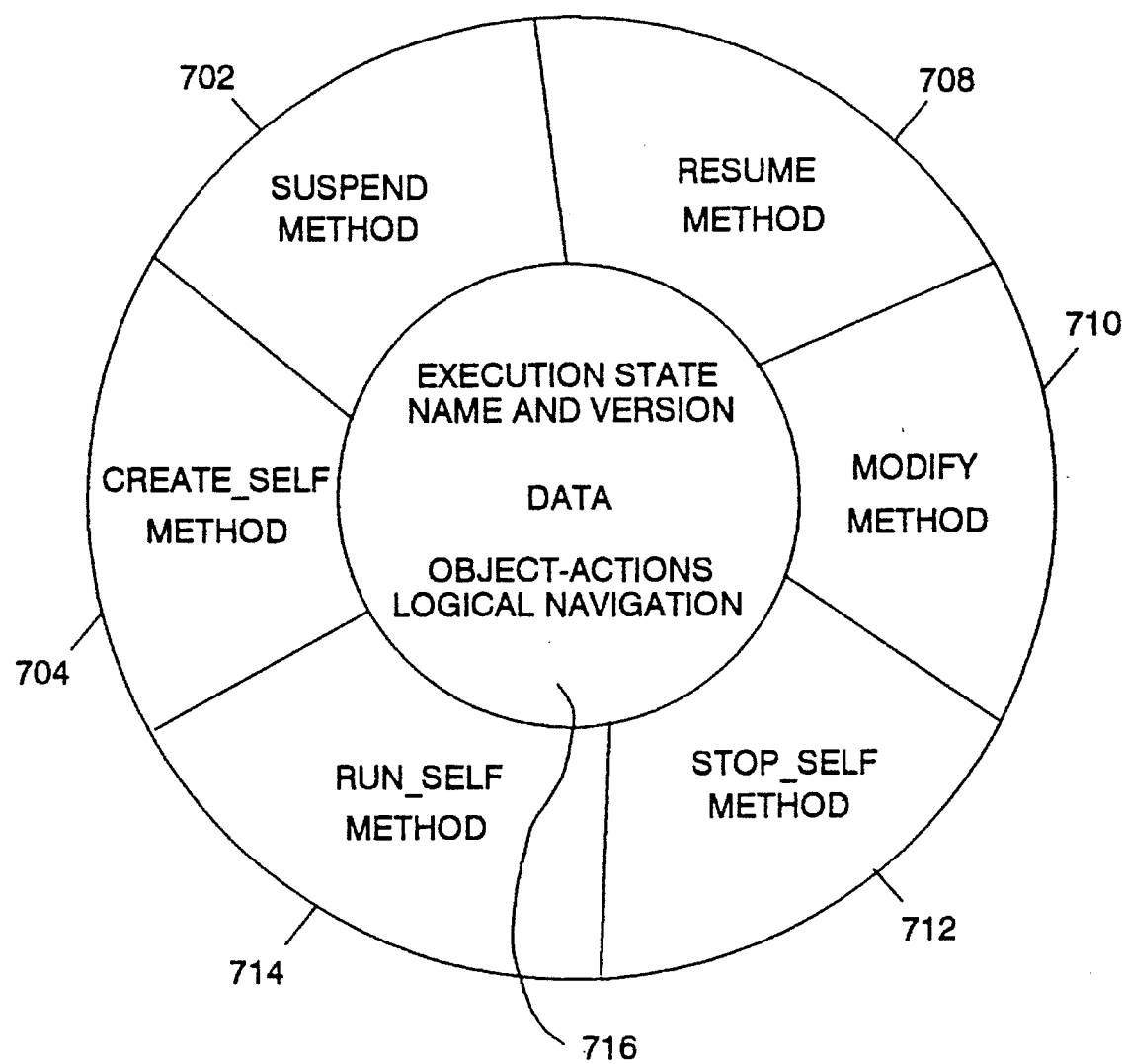
FIG. 7 shows an example of a business process object.

The structure of a business process object is depicted in FIG. 7. The business process object 702 is like any other object in that it has methods 704, 706, 70B, 710, 712, 714, and features and attributes 716. The business process object 702 is a composite object, in that its frame may contain complex data structures in data slots that may be defined as other objects and may also reference another business process object as one of the slots.

A process object class that defines a complex object and allows naming of object instances by the user, is one way to implement such an object. The business process object inherits create, run and stop class methods from the process object class and has several attributes that are the same as that of the process object class.

Figure 8:
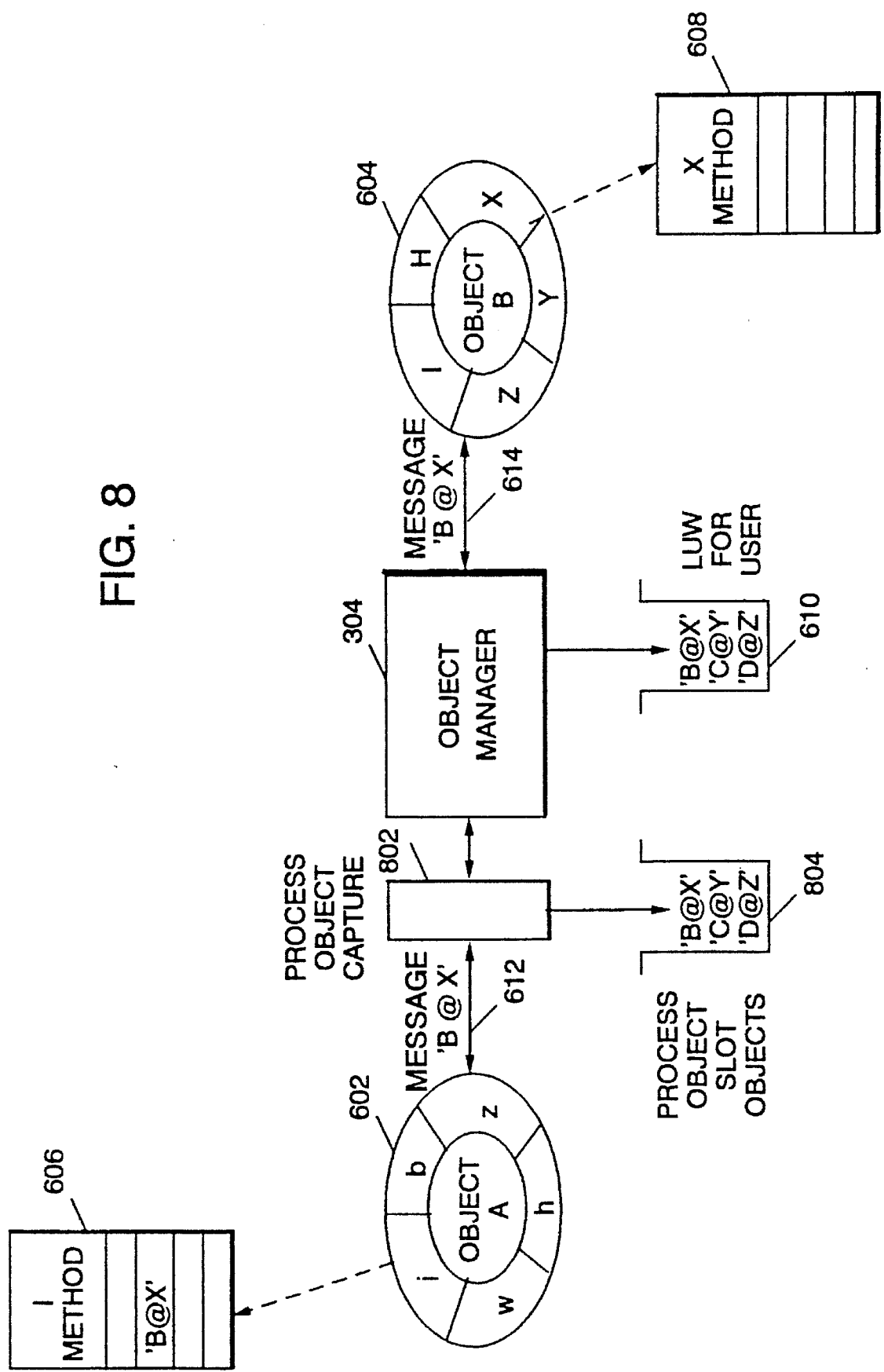
FIG. 8 shows an example of object manager message routing with process object class capture function.

To use a business process object 702, the user creates the business process object instance on his "desktop" (i.e., workstation user interface), selects the object's data instance and specifies a CREATE method 704 to define the logical navigation and a sequence of object-actions as slots in the business process object 702. The CREATE method 704 must enable logic 802 in the object-action message processing of the user interface to capture the object-action messages as they are sent to the object manager 304 after selection by the user. As illustrated in FIG. 8, method I 606 of object A 602 sends a message 'B@X' 612. The message is intercepted on its normal routing to object manager 304 by a message capture function 802 of the process object class. This function captures the message 612 in a slot 804 for a business process object 702. The object manager 304 routes the message 614 to object B 604 for execution of method X 608.

When a business process object 702 is selected from the desktop, a list of actions (i.e., methods of the business process object and its class) are made selectable. The user then specifies the method to be performed with the business process object.

Execution of a business process object begins and ends with logical unit of work start and commit actions. Execution of a business process object requires implementation of the capability to suspend or interrupt an existing logical unit of work, run a sequence of object-action messages as defined in the business process object, and then resume the interrupted logical unit of work as before. Nested business process objects, implying nested logical units of work, must also be managed by the suspend/resume logical unit of work processing. If a business process fails during execution, it can be rolled back without impacting the user's previous logical unit of work state, and allow restart at the proper point in the original business process. (Such failure may cause the original business process to also fail.)

Figure 9:
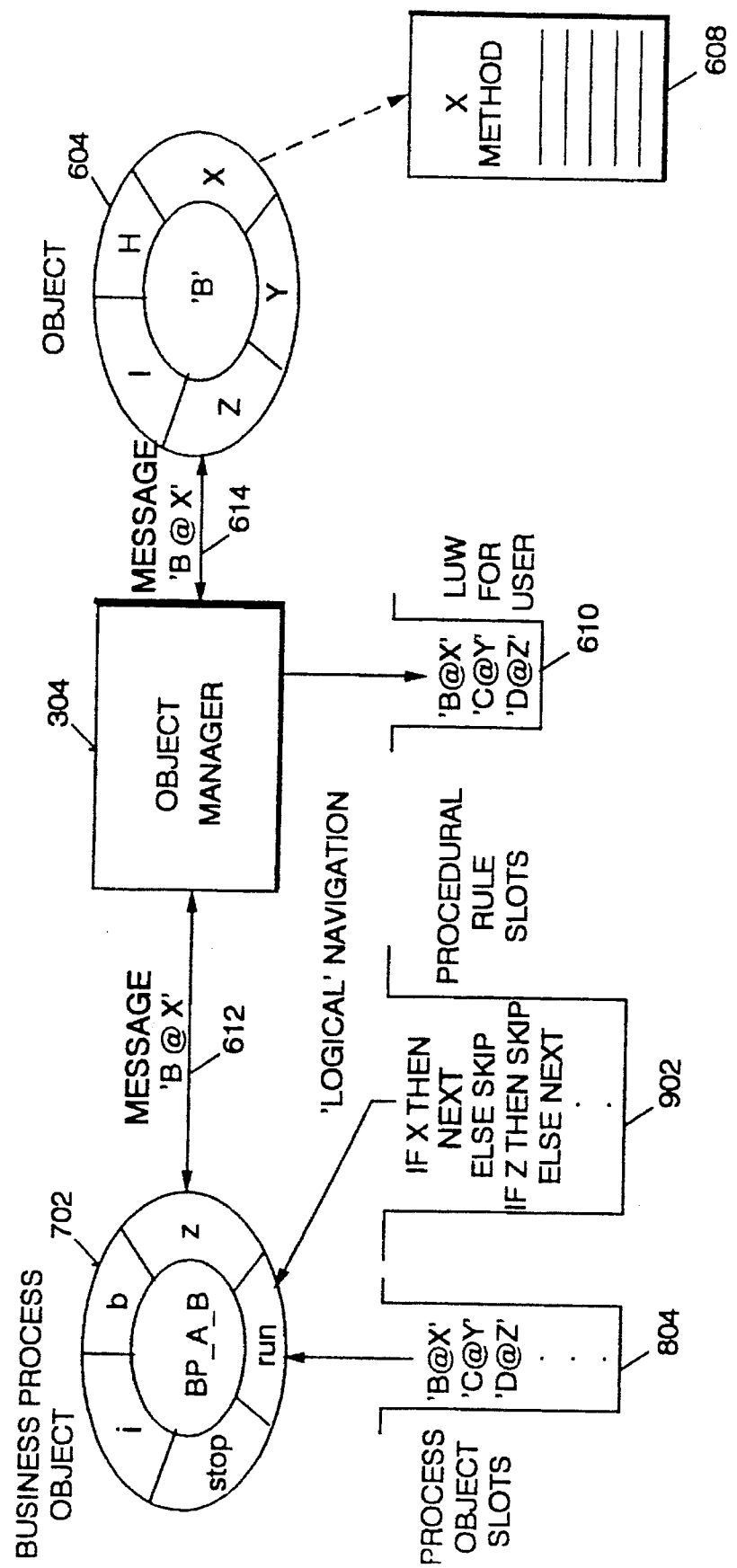
FIG. 9 shows an example of business process object message routing.

When the user decides to repeat the business process, the business process object instance is selected and the RUN method 714 is specified. Business process object message routing during execution is depicted in FIG. 9. The business process object 702 materializes the container of messages captured in slots 804 for the business process, and sends them, in the order and logical navigation sequence previously defined, to the object manager 304. The 'B@X' message 612, captured as part of the business process object slots 804, is sent in turn to the object manager 304 which routes the message 614 to object B 604 for execution of method X 608.

Figure 10:
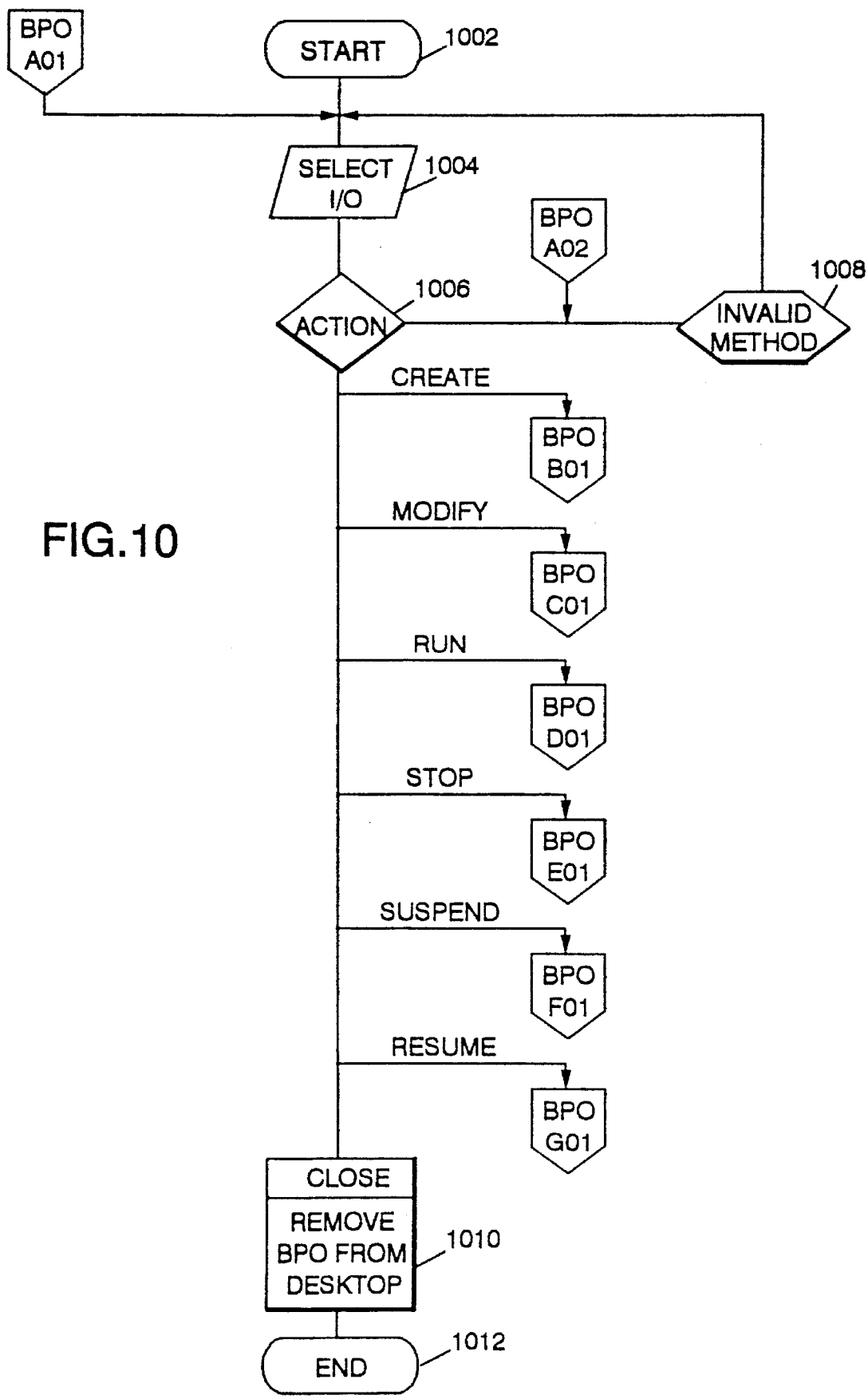
FIG. 10 shows an operational flowchart of business process object method selection.
Figure 11:
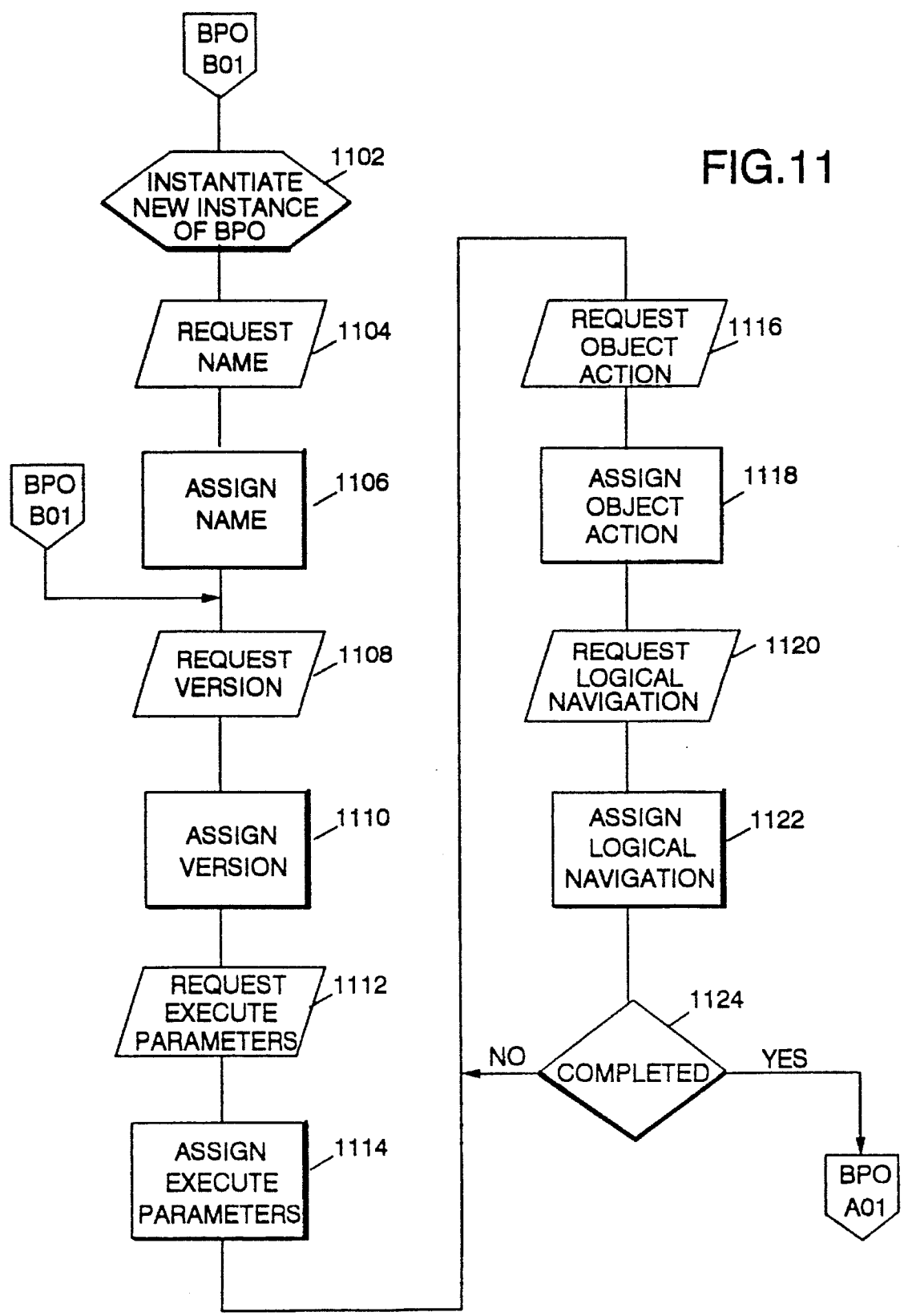
FIG. 11 shows an operational flowchart for the CREATE method in connection with the present invention.

FIG. 10 is a flowchart representing the implementation of the process for selecting business process object methods from the user interface desktop. At logic block 1004, the user is presented with a list of actions that can be performed with the business process object 702. These include create, modify, run, stop, suspend and resume. The user makes his selection at decision block 1006. If the user selects the CREATE method 704, processing continues as indicated by the flowchart of FIG. 11.

FIG. 10A illustrates a method of storing and executing a plurality of object and action pairs in an object oriented computing environment. At block 2000 the business process instance is generated, then at block 2010 the execution parameters are assigned for the process. A name is assigned to the process at block 2020 based on a first user input from the user interface (shown by block 2022) and a version identifier is assigned at block 2030 based on a second user input from the user interface (shown by block 2032). At block 2040 the object and action pairs are stored in a business process instance and at block 2050 the business object is executed through the user interface and specifying a method to be performed by said business process object instance.

The CREATE method 704 of the business process object 702 is inherited from the process object class. This method creates an instance of the business process object 702 and populates the required slots and attributes. At logic block 1102, a new instance of the business process object 702 is created and initialized. The instance is allocated and populated with the class and instance variables. At logic block 1104, the user is requested to name this instance of the business process object 702. A list box or other form of data input mechanism is presented to the user to allow naming of this instance of the business process object 702. At logic block 1106, the specified name is validated and assigned to the business project object instance. Validation consists of a check to assure uniqueness within the business process object instance. The specified name is the title of the icon representing the business process object instance that is displayed on the user's desktop. The user is then requested to assign a version identifier for the business process object instance in logic block 1108. A list box or other form of data input mechanism is presented to the user to allow the specification of a version identification for this instance of the business process object. Versioning of the business process object instances is governed by the capability of the execution environment and database facilities to support multiple instances of the same named business process object 702. In logic block 1110, the specified version is validated and assigned to the business process object instance.

At logic block 1112, the user is requested to define execution parameters for this business process object instance. A list box is presented to the user to allow definition of these parameters. The execution parameters defined by the user specify when and how this instance of business process object is to be executed. The specified parameters are assigned to attributes of this instance of the business process object 702 in logic block 1114. Execution parameters are limited to those that can be utilized by the execution environment. If time-initiated signals can be generated, then a time-initiated execution is supported and can be defined. Class methods of the process object class must support these execution parameters.

The next sequence of the steps in the processing are part of a logic loop in which object-action pairs are captured and saved as part of the business process object instance. In logic block 1116, the user is requested to define an object and action pair that is to be performed at this point in the business process. Desktop mechanisms are enabled to process the selection of an object and action when done in the context of the creation or modification of a business process object. The user defines this pair by selecting them from the desktop. Desktop mechanisms build the specific object-action message using list boxes to request additional input and display user choices. Next, in logic block 1118, the object-action message is captured and placed in the next slot object of the business process object instance. The user is then requested, in logic block 1120, to define any logical navigation based on conditional parameters or data that are present as a result of the object-action message. A list box or other form of data input mechanism is presented to the user to allow definition of logical navigation information. The user must define the input/output data and variables that may be tested, and the condition of the tests and the processing steps to be taken for certain test results. In logic block 1122, the logical navigation definition is assigned to the corresponding slot object of the business process object instance which matches the object-action message behavior to be tested. Decision block 1124 tests for completion of the definition of the business process object instance. Completion of the definition is signalled by the user selecting "complete" for the business process object instance or selecting the "file" action. This causes processing to exit the CREATE method 704 and return to logic block 1004 in FIG. 10 which again presents the user with the display screen showing the business process object instances that are selectable. If at decision block 1124 in FIG. 11, definition of the business process object instance is not complete, processing returns to logic block 1102 where the user is prompted for another object-action pair.

To modify an instance of a business process object, the user selects the MODIFY method 710 at logic block 1004 in FIG. 10. Processing of this user selection is illustrated by the flow chart of FIG. 12. Entry into the MODIFY method 710 is at decision block 1202, where a determination is made if the business process object 702 is in a run state. If the business process object 702 is in a run state, then modification is assumed to be for a new version of the business process object 702. If the business process object 702 is not in a run state, then modification is assumed to be on the selected version of the business process object.

For a business process object 702 in a run state, logic processing proceeds down the left side of the flow chart. In logic block 1204, a new instance of the business process object 702 is created. The execution parameters are copied from the existing business process object version to the new version as indicated in logic block 1206. The object-action definitions and logical navigation statements are copied from the existing business process object version to the new version as shown in logic blocks 1208 and 1210, respectively. Processing then transfers to the CREATE method 704 at logic block 1102 in FIG. 11 to modify the existing version of the business process object 702. When the modifications are complete, the new version of the business process object 702 is available for selection on the user's desktop.

Figure 12:
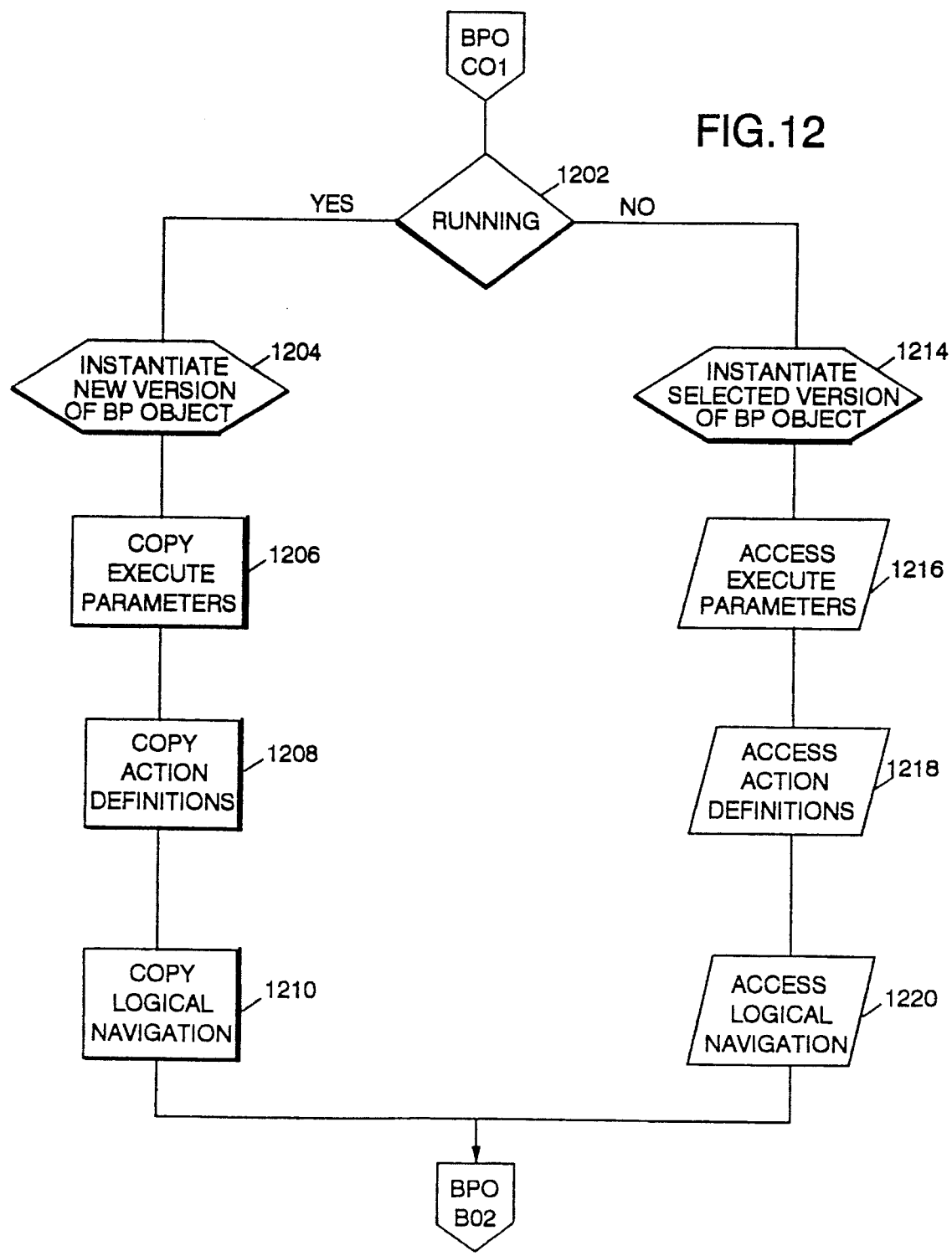
FIG. 12 shows an operational flowchart for the MODIFY method in connection with the present invention.
Figure 13:
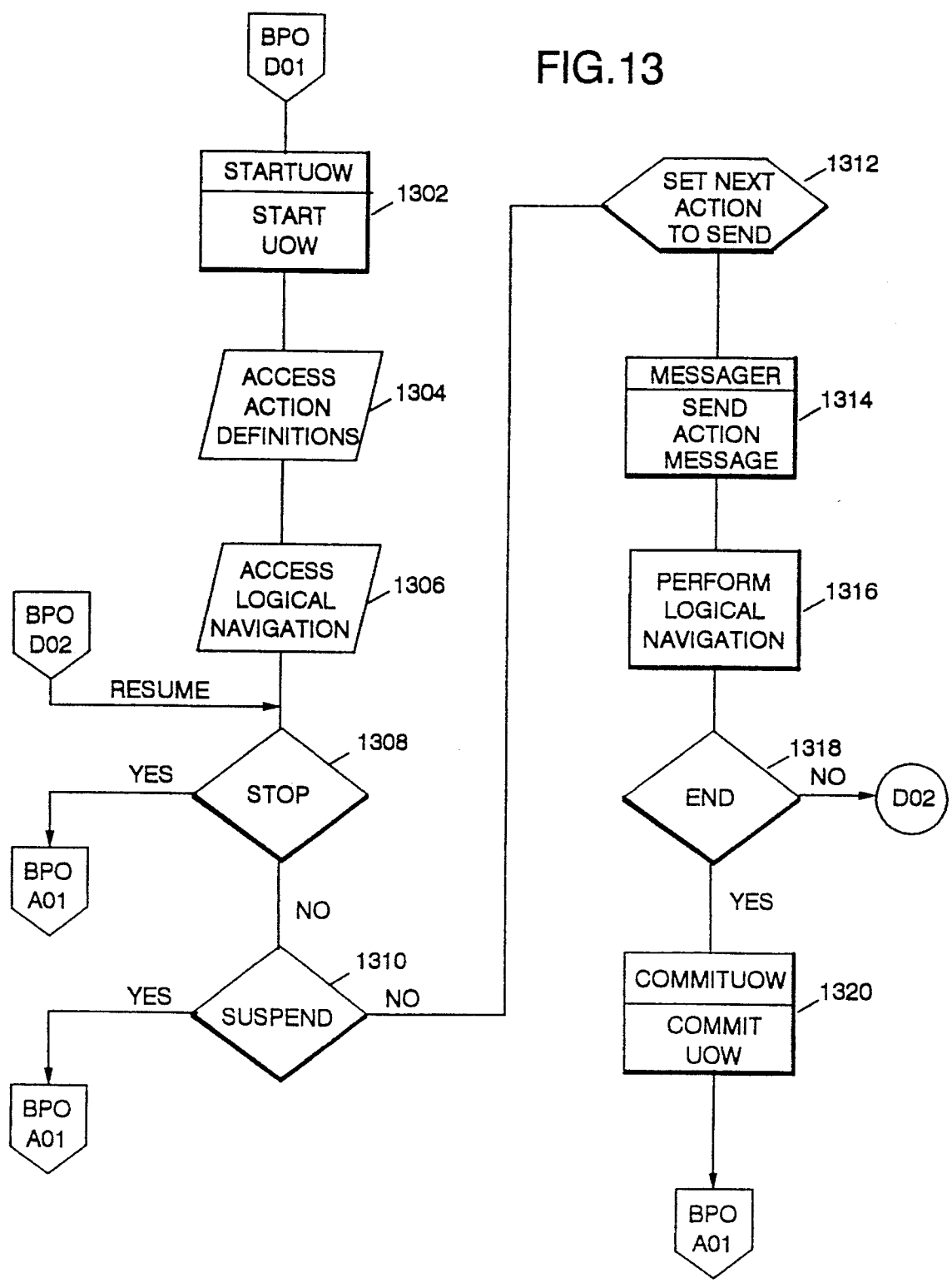
FIG. 13 shows an operational flow chart for the RUN method in connection with the present invention.

For a selected business process object 702 that is not in a run state, logic processing proceeds down the right side of the flow chart in FIG. 12. The selected version of the business process object 702 is instantiated as shown in logic block 1214. Execution parameters are then accessed from the database as shown in logic block 1216. Next, object-action message definitions and logical navigation statements are accessed from the database, as indicated in logic blocks 1218 and 1220, respectively. Processing transfers to the CREATE method 704 at logic block 1102 in FIG. 11. The existing version of the business process object 702 is modified, as required. When modifications are completed, the updated version of the business process object 702 is available for selection on the user's desktop. At this point, processing returns to logic block 1004 in FIG. 10, where the user is again presented with the display screen showing the selectable business process object instances. If at decision block 1006, the user had selected the RUN method 714, processing transfers to the flow chart illustrated in FIG. 13.

In logic block 1302, a request is made to initiate a new unit of work for the user. This request initiates a recovery point for the process which is starting. Rollback or commit of this unit of work recovers or completes all data modifications made from this point. In logic blocks 1304 and 1306, the object-action message definitions and logical navigation statements in the business process object instance are accessed. A test is next made in decision block 1308 to determine if a stop action has been requested. Processing transfers to the method selection processing algorithm illustrated in FIG. 10, if a stop action request has been made. Otherwise, the algorithm continues with decision block 1310 where a test is made to determine if a suspend action request has been made. A suspend request also results in a transfer to the method selection processing algorithm illustrated in FIG. 10. If a suspend has not been requested, an object-action message definition is accessed in logic block 1312. The object-action message is sent using normal object oriented processes. Object oriented message processing includes the routing of the message to the target object and method as defined by the message. Arguments for the method are also passed as part of the message. This step of the RUN method 714 algorithm is reflected in the flow chart at logic block 1314. The next logical navigation statement is then performed as indicated at logic block 1316. The logical navigation statement may adjust the position of the next object-action to be accessed, or cause an event that leaves the control of the business process object 702.

Figure 14:
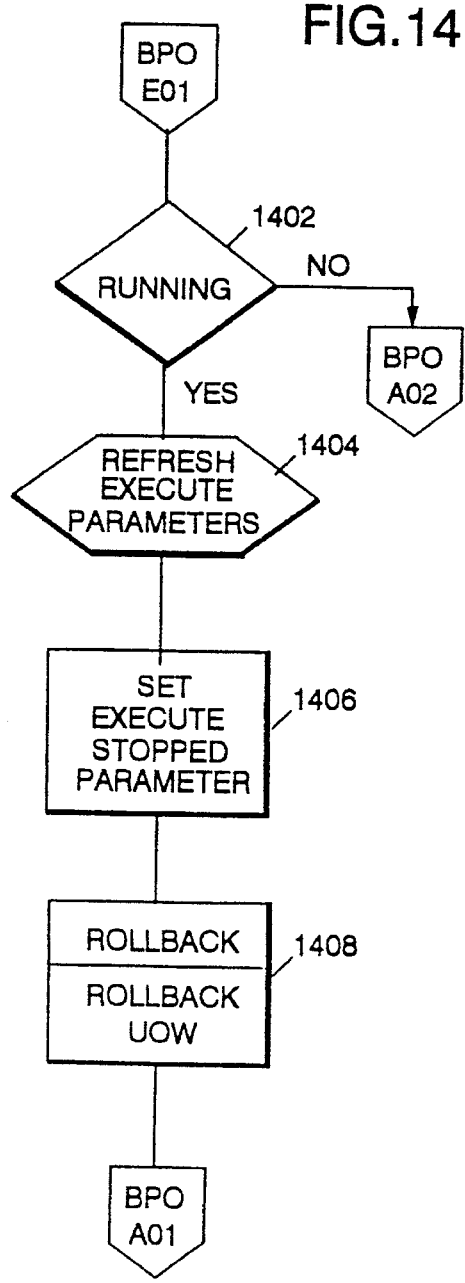
FIG. 14 shows an operational flow chart for the STOP method in connection with the present invention.

In decision block 1318, a test is made to determine if there are additional object-action messages to process. Processing continues with the next object-action message if there are additional object-action messages to process. The algorithm loops back to decision block 1308 to continue with this processing. If the final object-action message for the business process object instance has been reached, then a COMMIT_UOW request is issued. This step is indicated in logic block 1320. The commit step indicates to the unit of work manager 306 that the business process is complete and may be committed to the database. This step also completes the RUN method 714 algorithm causing control to return to main menu processing in FIG. 10. The user entry in logic block 1004 determines which algorithm will be executed next. If the stop action is requested, the test made by the main algorithm in decision block 1006 causes transfer to the STOP method 712 algorithm illustrated in FIG. 14.

The STOP method 712 algorithm starts in decision block 1402 with a test being made to determine if the business process object 702 is in a run state. If the business process object 702 is not in a run state, then the routine is exited and an error is signalled to the user as indicated by logic block 1008 in the main processing routine shown in FIG. 10. Otherwise, processing continues as indicated in logic block 1404 with execution parameters of the running business process object 702 being refreshed from the database. This is followed in logic block 1406 with a change in the run state of the business process object instance to indicate that the business process object 702 has been stopped. The STOP method 712 algorithm concludes in logic block 1408 with the unit of work represented by the business process object 702 being rolled back to its initial state by the UOW manager. The algorithm then causes control to return back to logic block 1004 in the main processing algorithm illustrated in FIG. 10. Decision block 1006 again tests for the next action entered by the user. If the suspend action is requested, decision block 1006 causes transfer to the SUSPEND method 706 algorithm illustrated in FIG. 15.

The processing steps of the SUSPEND method 706 starts out with a test in decision block 1502 to determine if the business process object 702 is in a run state. The suspend action is invalid for a business process object instance that is not in a run state. Thus, if the business process object instance is not in a run state, the SUSPEND method 706 algorithm is exited, and an error is identified to the user, as indicated by logic block 1008 shown in FIG. 10. For a running business process object instance, execution parameters are refreshed as indicated in logic block 1504. Next, the run state of the business process object instance is changed as shown in logic block 1506 to indicate that the business process object 702 has been suspended. The last step of the routine is to save the execution state of the business process object instance, including the current position of object-action and logical navigation. This step is reflected in logic block 1508 of the flow chart of FIG. 15. Processing control reverts to logic block 1004 in the main algorithm shown in FIG. 10. If a business process object 702 has been suspended previously, the user can select the resume action in logic block 1004. Once again, decision block 1006 tests for the action entered by the user. Request of the resume action causes control to transfer to the RESUME method 708 shown in FIG. 16.

The first step in the RESUME method 708 algorithm is to determine by decision block 1602 if the business process object 702 is in a suspended state. If the business process object 702 is not in a suspended state, the resume action is invalid for this business process object instance and the routine is exited. Control returns to logic block 1008 in FIG. 10 where the user is notified that he has selected an invalid method.

Figure 15:
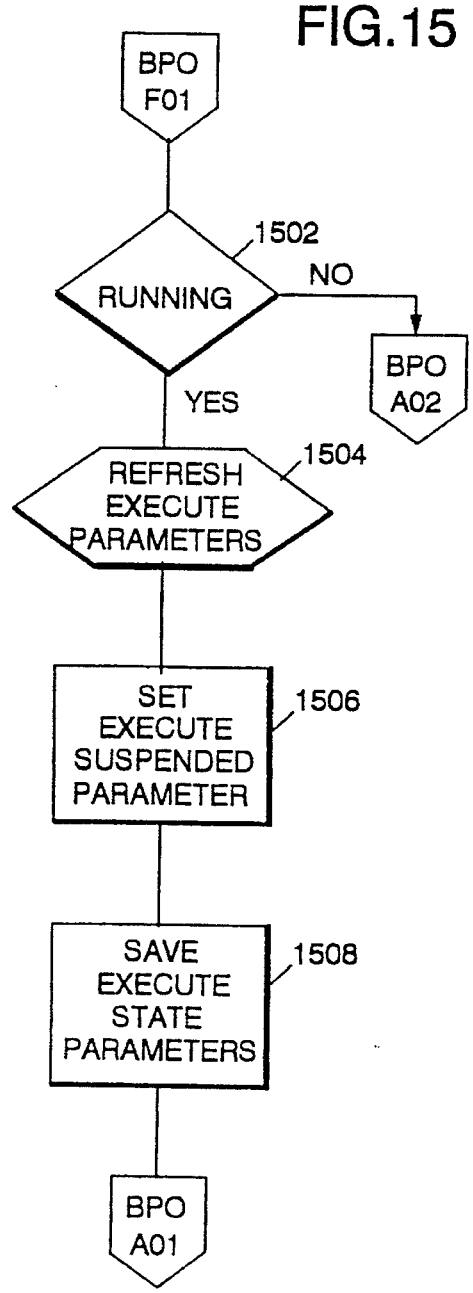
FIG. 15 shows an operational flow chart for the SUSPEND method in connection with the present invention.
Figure 16:
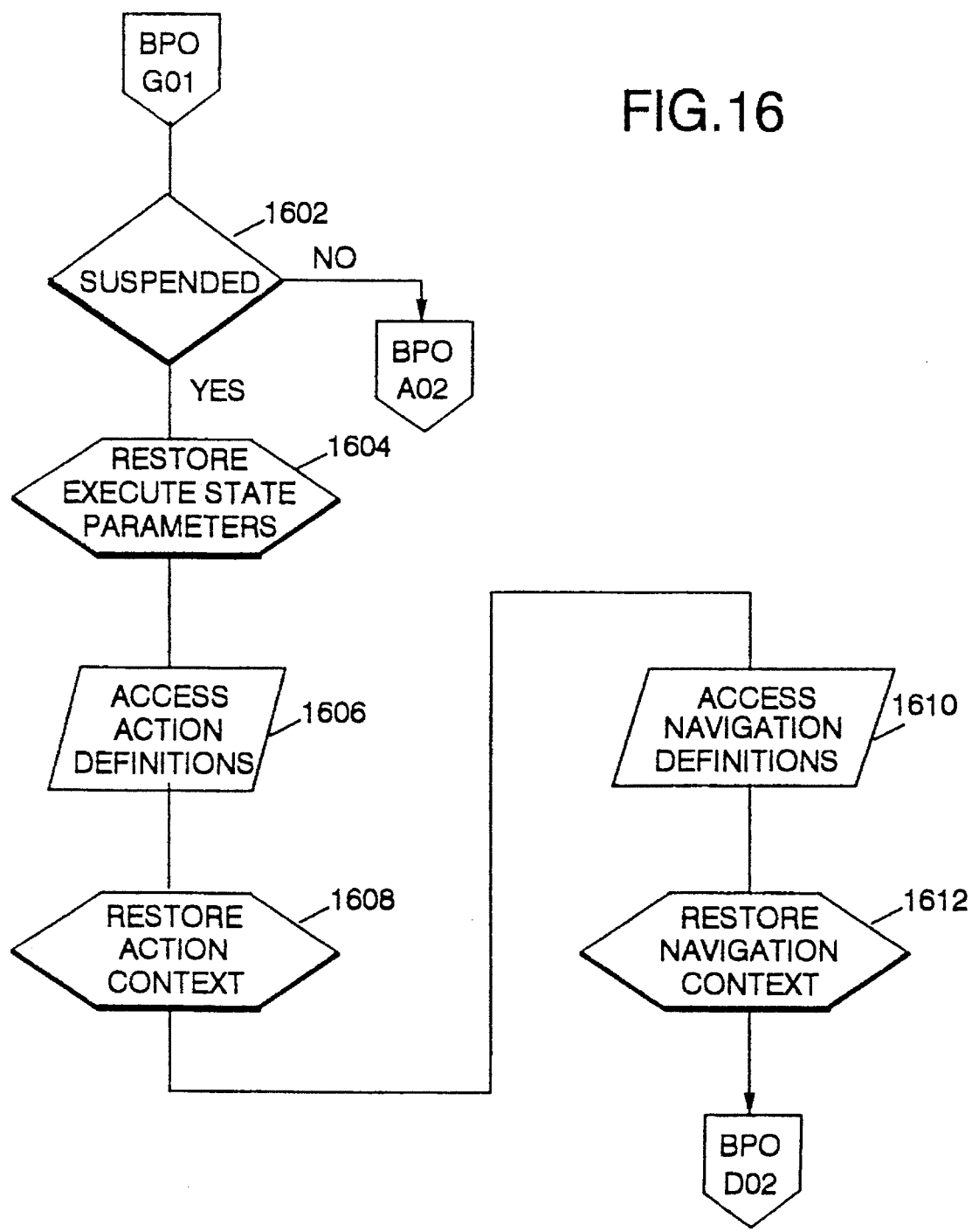
FIG. 16 shows an operational flow chart for the RESUME method in connection with the present invention.

In order to resume a suspended business process object instance, the execution parameters of the suspended business process object instance are refreshed from the database as indicated by logic block 1604 where they were saved as a result of execution of the SUSPEND method logic block 1508 as depicted in FIG. 15. The execution state of the business process object instance, including the current position of object-action and logical navigation, is also restored. In logic block 1606, the saved object-action message definitions are accessed in the business process object instance. The saved object-action message slot position is restored to the state prior to suspension as indicated in logic block 1608. The saved logical navigation statements are accessed in the business process object instance as shown in logic block 1610. The logical navigation slot position is restored to the state prior to suspension in logic block 1612. Control is then transferred to continue execution where the suspend action was performed on the business process object instance. Execution continues in the RUN method 714 at logic block 1302 in FIG. 13.

The following is an example of a particular embodiment of the presentation and execution of a set of business process instances that have been created. FIG. 17 provides an example of a list of business process instances that are selectable by the user. An object (EKNUTASK) is written to present this list of business processes, and respond to the user's selection. "LDRO" (logical data reference object), "EC" (engineering change) and "REA" (request for engineering action) are certain types of objects in an engineering management object oriented computing environment. A "folder TOC" (table of contents) is an object which can hold references to objects of other types. For the purpose of this example, it's sufficient to consider these simply as objects which are involved in a specific sequence of object-action pairs (messages) that are combined as a business process.

Generally, business processes which involve a sequence of panel interactions are handled according to the following pseudocode. Note that 'task' is synonymous in this context to a business process instance.

```
EKNUTASK@do_task
    <*(* Display the list of business processes - read
        the user's selection. *)*>;
    <*(* If the user makes a selection, initiate the task,
        otherwise exit. *)*>;
EKNUTASK@run_task
    <*(* Initiate the system for execution of a
        business process. *)*> is
    EKNUTASK@task_initiate
    <*(* Route control to the particular
        business process instance. *)*> is
    EKNUTASK@task_router
        <*(* Within a particular business process which
            involved interactions with the desktop,
            object-action pairs will be executed to :
        1.  Edit the panel object
            - dtafld_assign, selfld_select, sellst_select
        2.  Send messages to objects involved in the
            business process
            - do-command
        3.  Await user input to support the logical
            navigation rules of the business process
            - pmwait *)*>;
    <*(* Shutdown after the task completes. *)*> is
    EKNUTASK@task_shutdown
```

An example of the specific sequence of object-action pairs that could constitute a business process is indicated in the following pseudocode.

```
<*(* Select an item from a menu. *)*> is
EKNUTASK@selfld_select ("MENU02",the_list,rc);
<*(* Execute an "OPEN" action. *)*> is
EKNUTASK@do_ command (T_OPEN,NULL);
<*(* The business process awaits user input. *)*> is
EKNUTASK@pmwait(wait_rc'address);
<*(* Execute the "COPY" action. *)*> is
EKNUTASK@do_command (T_COPY,NULL);
<*(* Execute the "CANCEL" action. *)*> is
EKNUTASK@do_command (T_CANCEL,NULL );
```

The Appendix provides pseudocode for each of the methods invoked by the selected instance of a business process in the above example.

APPENDIX
package Taskmode_Metaclass is          -- EKNUTASK
--*******************************************************************
--*
--* MODULE NAME:          EKNUTASK
--*
--* DESCRIPTIVE NAME:     Taskmode_Metaclass
--*
--*
--* DESCRIPTION:          Task Mode Metaclass (EKNUTASK)
--*
--*                       This class handles the display of the task
--*                       popup, task initiation, and cleanup after
--*                       tasks are completed. "Task" is a synonym
--*                       for "business process".
--*
--*******************************************************************

-- EXPORT
    -- do_command,              --* defined below
    -- do_task,                 --* defined below
    -- dtafld_assign,           --* defined below
    -- pmwait,                  --* defined below
    -- popup_handler,           --* defined below
    -- selfld_select,           --* defined below
    -- sellst_select,           --* defined below
    -- task_name;               --* defined below -- INHERIT Object_class;        --\CLS.EKNOOBJ\
-- INHERIT App_package;         --\CLS.EKNUAPPS\
-- INHERIT DASH_PACKAGE;        --\CLS.EKNUDB\

-- CLASS ATTRIBUTES

TASK_DTL_NAME :   STRING(DTL_NAME_SIZE) := "EKNUTASK";
                                    --\ATR.TASK_DTL_NAME.EKNXSTR\
        --* USAGE:         I1
        --* Dialog tag file name of the task popup
        --* If the dialog tag name of the task panel is different, the
        --* customer can redefine this attribute.

task_name : String (DTL_NAME_SIZE);   --\ATR.task_name.EKNXSTR\
        --* USAGE:         RE
        --* The task to be handled

-- INSTANCE ATTRIBUTES

-- CLASS METHODS

```
--*********************************************************************
--* --* METHOD NAME:         do_command
--*
--* DESCRIPTION:             Executes the input command.
--*
--*                          This procedure is exposed to support
--*                          task oriented mode.  This procedure
--*                          is invoked from a task definition to
--*                          execute a command against the
--*                          currently active panel.
--*
--*
--* METHOD TYPE:             Procedure
--*
--* EFFECTIVITY:             Effective
--*
--* USAGE:                   G1
--*
--* EXCEPTIONS RAISED:       PRECONDITION_VIOLATION
--* EXCEPTIONS HANDLED:      NONE
--********************************************************************* procedure do_command(                   --\MTH.do_command\
        command_name : in String;           --\VAR.command_name.EKNXSTR\
        --* Name of the command to be executed
        rc : in out Return_code_class)      --\VAR.rc.EKNXRC\
        --* Return code - may be created or NULL
        --*
        --* Possible return code values if return code created
        --*    0 ==>  completed successfully
        --*   -1 ==>  not completed due to error
        --*
        --* If NULL is passed and the operation can't complete,
        --* TASK_ABORTED is raised.

<*(* Rout the command to the current panel. *)*>;

--*********************************************************************
--*
--* METHOD NAME:             do_task
--*
--* DESCRIPTION:             This procedure initiates tasks by displaying
--*                          the task popup and invoking "run_task" to
--*                          handle the task selected.
--*
--* METHOD TYPE:             Procedure
--*
--* EFFECTIVITY:             Effective
--*
--* USAGE:                   RE
--*
--*
```

```
--***************************************************************** procedure do_task                        --\MTH.do_task\

<*(* Present and process a task list.  *)*>;

--*****************************************************************
--*
--* METHOD NAME:        run_task
--*
--* DESCRIPTION:        This procedure initiates and runs a particular
--*                     task.
--*
--* METHOD TYPE:        Procedure
--*
--* EFFECTIVITY:        Effective
--*
--* USAGE:              RE
--*
--*
--***************************************************************** procedure run_task (                     --\MTH.run_task\
         the_task     : in String;             --\VAR.the_task.EKNXSTR\
         --* Name of the task to be processed
         rc      : in out Return_code_class)   --\VAR.rc.EKNXRC\
         --* Return code <*(* Run the task.  *)*>;
      -- PRECONDITION (not rc.all.VOID);
```

```
--********************************************************************
--*
--* METHOD NAME:        popup_handler
--*
--* DESCRIPTION:        Assign data to a popup.
--*
--*                     This procedure is called to allow
--*                     an executing task to assign data to a
--*                     popup which is displayed as a result of
--*                     the task definition.
--*
--*                     Descendants rename/redefine this method for
--*                     each popup in their task which requires
--*                     additional data to continue.  For popups
--*                     which do not need additional data (and
--*                     can be bypassed by simulating a press of
--*                     the "enter" key, this method is unnecessary.
--*
--*
--*
--* METHOD TYPE:        Procedure
--*
--* EFFECTIVITY:        Conditional
--*
--* USAGE:              P1
--*
--* NOTES:              This method is invoked from "display" of
--*                     a popup, if we're in task mode.
--*
--* EXCEPTIONS RAISED:  PRECONDITION_VIOLATION
--* EXCEPTIONS HANDLED: None
--******************************************************************** procedure popup_handler(               --\MTH.popup_handler\
      the_task   : in String;             --\VAR.the_task.EKNXSTR\
         --* Task name
      popup      : in Popup_class;        --\VAR.popup.EKNUPOP\
         --* Popup instance
      p_rc       : in out Return_code_class;
                                          --\VAR.p_rc.EKNXRC\
         --* Return code
      wait_flag  : in out Boolean)        --\VAR.wait_flag.EKNXBOOL\
         --* Flag indicating whether the popup should wait for input <*(* Invoked when a popup is displayed in task mode.  *)*>;
      -- PRECONDITION (not p_rc.all.VOID);
```

```
--********************************************************************
--*
--* METHOD NAME:        task_shutdown
--*
--* DESCRIPTION:        This procedure returns us from task mode to
--*                     normal interactive mode.
--*
--* METHOD TYPE:        Procedure
--*
--* EFFECTIVITY:        Effective
--*
--* USAGE:              RE
--*
--*
--******************************************************************** procedure task_shutdown (                   --\MTH.task_shutdown\
        proc_rc   : in out Return_code_class;   --\VAR.proc_rc.EKNXRC\
        --* Return code
        cleanup_flag : in Boolean)              --\VAR.cleanup_flag.EKNXBOOL\
        --* Flag indicating whether or not am leaving <*(* Initiate task mode by switching to the main menu.  *)*>;
    -- PRECONDITION (not proc_rc.all.VOID);

--********************************************************************
--*
--* METHOD NAME:        task_initiate
--*
--* DESCRIPTION:        This procedure initiates tasks by switching
--*                     focus to the main menu.
--*
--* METHOD TYPE:        Procedure
--*
--* EFFECTIVITY:        Effective
--*
--* USAGE:              RE
--*
--*
--******************************************************************** procedure task_initiate (                   --\MTH.task_initiate\
        proc_rc   : in out Return_code_class)   --\VAR.proc_rc.EKNXRC\
        --* Return code <*(* Initiate task mode by switching to the main menu.  *)*>;
    -- PRECONDITION (not proc_rc.all.VOID);
```

```
--***************************************************************
--*
--* METHOD NAME:          task_router
--*
--* DESCRIPTION:          Route control to a task.
--*
--*                       This procedure invokes the appropriate task
--*                       processing code based on the input task name.
--*
--*                       This procedure handles a set of tasks which
--*                       add objects to a folder:
--*                           1.  Adding a new LDRO to a folder TOC
--*                           2.  Adding an existing LDRO to a folder TOC
--*                           3.  Adding an existing EC to a folder TOC
--*                           4.  Adding an existing REA to a folder TOC
--*                           5.  Adding an existing folder to a folder TOC
--*
--*                       Descendants must redefine this method to add
--*                       additional tasks to the system.
--*
--* METHOD TYPE:          Procedure
--*
--* EFFECTIVITY:          Conditional
--*
--* USAGE:                P1
--*
--* EXCEPTIONS RAISED:    PRECONDITION_VIOLATION
--* EXCEPTIONS HANDLED:   None
--*************************************************************** procedure task_router (                    --\MTH.task_router\
        the_task      : in String;             --\VAR.the_task.EKNXSTR\
        --* Name of the task to be processed
        rc            : in out Return_code_class;  --\VAR.rc.EKNXRC\
        --* Return code
        cleanup_flag  : out Boolean)           --\VAR.cleanup_flag.EKNXBOOL\
        --* Return code <*(* Present and process a task list.  *)*>;
    -- PRECONDITION (not rc.all.VOID);
```

```
--******************************************************************
--*
--* METHOD NAME:        dtafld_assign
--*
--* DESCRIPTION:        Assign data to a data entry field.
--*
--*                     This procedure assigns a string to the input
--*                     data entry field (DTAFLD).  The data entry
--*                     field must exist on the current panel.
--*
--* METHOD TYPE:        Procedure
--*
--* EFFECTIVITY:        Effective
--*
--* USAGE:              G1
--*
--* NOTES:
--*
--* EXCEPTIONS RAISED:  PRECONDITION_VIOLATION
--* EXCEPTIONS HANDLED: None
--****************************************************************** procedure dtafld_assign    (              --\MTH.dtafld_assign\
        dtafld_name    : in String;           --\VAR.dtafld_name.EKNXSTR\
        --* Name of the data field to be updated
        data           : in String;           --\VAR.data.EKNXSTR\
        --* Data being assigned to the field
        rc             : in out Return_code_class)  --\VAR.rc.EKNXRC\
        --* Return code - may be created or NULL
        --*
        --* Possible return code values if return code created
        --*   0 ==>  completed successfully
        --*  -1 ==>  not completed due to error
        --*
        --* If NULL is passed and the operation can't complete,
        --* TASK_ABORTED is raised.

<*(* Assign data to an entry field.  *)*>;
```

```
--***********************************************************************
--*
--* METHOD NAME:        pmwait
--*
--* DESCRIPTION:        Wait for user input.
--*
--*                     This procedure causes task mode to display
--*                     panels created during task execution and
--*                     wait for user input.  If the input return
--*                     code contains a message, it is displayed
--*                     in the message area.  This is
--*                     useful for displaying instructions to the
--*                     user such as "Select the desired folder
--*                     and press ENTER".
--*
--* METHOD TYPE:        Procedure
--*
--* EFFECTIVITY:        Effective
--*
--* USAGE:              C1
--*
--* NOTES:
--*
--* EXCEPTIONS RAISED:  PRECONDITION_VIOLATION
--* EXCEPTIONS HANDLED: None
--*********************************************************************** procedure pmwait(                          --\MTH.pmwait\
       rc : in out RETURN_CODE_CLASS)          --\VAR.rc.EKNXRC\
         --* Return code <*(* pmwait *)*>;
```

```
--*******************************************************************
--*
--* METHOD NAME:         selfld_select
--*
--* DESCRIPTION:         Select a choice from a static list.
--*
--*                      This procedure selects a choice from a static
--*                      list (SELFLD).
--*
--* METHOD TYPE:         Procedure
--*
--* EFFECTIVITY:         Effective
--*
--* USAGE:               G1
--*
--* NOTES:
--*    Error messages returned are :
--*        EKNU102 - field found, but choice not found
--*        EKNU103 - field found, but of the wrong type
--*        EKNU104 - field not found
--*
--* EXCEPTIONS RAISED:   PRECONDITION_VIOLATION
--* EXCEPTIONS HANDLED:  None
--******************************************************************* procedure selfld_select (                    --\MTH.selfld_select\
        selfld_name    : in String;              --\VAR.selfld_name.EKNXSTR\
        --* Name of the static list to be updated
        choice_name    : in String;              --\VAR.choice_name.EKNXSTR\
        --* Choice being selected from the field
        rc             : in out Return_code_class)  --\VAR.rc.EKNXRC\
        --* Return code - may be created or NULL
        --*
        --* Possible return code values if return code created
        --*    0 ==>  completed successfully
        --*   -1 ==>  not completed due to error
        --*
        --* If NULL is passed and the operation can't complete,
        --* TASK_ABORTED is raised.

<*(* Select the choice from the SELFLD.  *)*>;
```

```
--*******************************************************************
--*
--* METHOD NAME:        sellst_select
--*
--* DESCRIPTION:        Select a row in a dynamic list.
--*
--*                     This procedure selects a row from a dynamic
--*                     list (SELLST) using the "find" function.
--*                     The find functions exactly as if an
--*                     interactive find was executed.
--*
--* METHOD TYPE:        Procedure
--*
--* EFFECTIVITY:        Effective
--*
--* USAGE:              G1
--*
--* NOTES:
--*     Error messages returned are :
--*         EKNU105 - method not available on an EKNUPANL
--*         EKNU110 - field found, but of the wrong type
--*         EKNU111 - field not found
--*         EKNU113 - All ok, except value not found
--*
--* EXCEPTIONS RAISED:  PRECONDITION_VIOLATION
--* EXCEPTIONS HANDLED: None
--******************************************************************* procedure sellst_select (                --\MTH.sellst_select\
       sellst_name : in String;               --\VAR.sellst_name.EKNXSTR\
         --* Name of the dynamic list to be updated
       data : in String;                      --\VAR.data.EKNXSTR\
         --* Data to be used for the match
       bounds : in STRING;                    --\VAR.bounds.EKNXSTR\
         --* Search bounds
         --*
         --*   T_CUR_TO_BOT    ==> Search from current to bottom
         --*   T_TOP_TO_BOT    ==> Search from top to bottom
         --*   T_CUR_AND_WRAP  ==> Search from current and wrap rc : in out Return_code_class)         --\VAR.rc.EKNXRC\
         --* Return code - may be created or NULL
         --*
         --*  Possible return code values if return code created
         --*    0 ==>  completed successfully
         --*   -1 ==>  not completed due to error
         --*
         --*  If NULL is passed and the operation can't complete,
         --*  TASK_ABORTED is raised.
```

```
    <*(* Select the row from a SELLST.  *)*>;
      -- PRECONDITION ( (CLASS_REF(EKNOCMM).compatible(
      --                 CLASS_REF(EKNUDBWD).current_panel.class_id,
      --                 STATIC_CLASS_ID(EKNUPLST))) and
      --                ((c.strcmp(bounds, T_CUR_TO_BOT) = 0) or
      --                 (c.strcmp(bounds, T_TOP_TO_BOT) = 0) or
      --                 (c.strcmp(bounds, T_CUR_AND_WRAP) = 0)));

end Taskmode_Metaclass;
```

While the invention has been particularly shown and described with respect to the particular embodiment thereof, it will be understood by those skilled in the art that various changes in form and details may be made therein without departing from the spirit and scope of the invention.

We claim:

1. A method for storing and executing a plurality of object and action pairs as a business process in an object oriented computing environment, said method adapted to operate on one or more computer platforms and comprising the steps of:

generating a business process object instance;

defining execution parameters for said business process object instance, said step of defining execution parameters for said business process object instance including receiving and responding to a first input from the user interface assigning a name to said business process object instance and assigning a version identifier to said business process object instance in response to a second input;

responding to an interactive user selection of object and action pairs to be executed in said business process;

storing said selected object and action pairs and placing them in said business process object instance; and executing said business process object instance by selecting said business process object instance through a user interface and specifying a method to be performed by said business process object instance; and executing said business process object instance by selecting said business process object instance through a user interface and specifying a method to be performed by said business process object instance.

2. The method of claim 1 wherein the step of defining execution parameters for said business process object instance further includes the steps of:

receiving a parameter for each of a plurality of attributes associated with said business process object instance; and assigning said specified parameters to said business process object instance.

3. The method of claim 2 wherein the step of selecting interactively object and action pairs to be performed includes:

(a) presenting to the user a list of objects for possible addition to said business process object instance;

(b) receiving an input object from said list of objects;

(c) in response to selection of said object by the user, presenting a list of actions that can be performed on said object;

(d) receiving an input action corresponding to said selected object; and (e) repeating steps (a)–(d) for each object and action pair that is part of the business process instance.

4. The method of claim 3 wherein the step of storing said selected object and action pairs includes:

sending a plurality of messages including a selected object and action pair to an object manager in the order in which said plurality of messages are to be performed;

placing each of said plurality of messages as it is received by the object manager into a plurality of objects forming the business process object instance.

5. The method of claim 4 wherein the step of executing said business process object instance includes:

in response to a selection by the user, initiating a new unit of work for the business process object instance to be executed;

accessing the plurality of messages containing each selected object and action pair stored in objects forming the business process object instance;

routing each of said plurality of messages sequentially to each selected object so that the associated action can be performed on said each selected object, and after each of said plurality of messages has been routed to each selected object and the associated action performed, sending a command to a unit of work manager to enter all data modifications made during the execution of the business process object instance into a database.

6. A system for storing and executing a plurality of object and action pairs as a business process in an object oriented computing environment, said system adapted to operate on one or more computer platforms and comprising:

means for generating a business processes object instance;

means for defining execution parameters for said business process object instance, said means for defining including means for receiving a parameter for each of a plurality of attributes associated with said business process object instance and means for assigning said specified parameters to said business process object instance;

means for responding to an interactive user selection of object and action pairs to be executed in said business process;

means for capturing said selected object and action pairs in said business process object instance;

means for executing said business process object instance by selecting said business process object instance through a user interface; and means for specifying a method to be performed by said business process object instance.

7. The system of claim 6 wherein the means for responding to an interactive user selection of object and action pairs to be executed includes:

means for presenting to the user a list of objects for possible addition to said business process object instance;

means for receiving an object selected from said list of objects;

means for presenting a list of actions that can be performed on said selected object; and means for selecting an action corresponding to said selected object.

8. The system of claim 7 wherein the means for capturing said selected object and action pairs includes:

means for sending a plurality of messages containing each selected object and action pair to an object manager in the order in which said plurality of messages are to be performed;

means for placing each of said plurality of messages as it is received by the object manager into a plurality of objects forming the business process object instance.

9. The system of claim 8 wherein the means for executing said business process object instance includes:

means for initiating a new unit of work for the business process object instance to be executed;

means for accessing the plurality of messages containing each selected object and action pair stored in objects forming the business process object instance;

means for routing each of said plurality of messages sequentially to each selected object so that the associated action can be performed on said each selected object, and means for sending a command to a unit of work manager to enter all data modifications made during the execution of the business process object instance into a database.

* * * * *